(12) United States Patent
Baxter et al.

(10) Patent No.: US 7,424,795 B2
(45) Date of Patent: Sep. 16, 2008

(54) METHOD FOR EXTRUDING AND PRODUCT OF THE METHOD

(75) Inventors: Rex Baxter, Excelsior Springs, MO (US); Ade Adebo, Shawee Mission, KS (US)

(73) Assignee: Variform, Inc., Kearney, MO (US)

( * ) Notice: Subject to any disclaimer, the term of this patent is extended or adjusted under 35 U.S.C. 154(b) by 0 days.

(21) Appl. No.: 10/620,545

(22) Filed: Jul. 16, 2003

(65) Prior Publication Data
US 2005/0013968 A1 Jan. 20, 2005

(51) Int. Cl.
*E04C 2/38* (2006.01)
(52) U.S. Cl. .................. 52/718.02; 52/717.05; 52/543; D25/139
(58) Field of Classification Search ............... 52/211, 52/717.01, 717.05, 204.55, 547, 543, 208, 52/520, 518, 506.1, 287.1, 716.1, 521, 519, 52/718.02; D25/136, 124, 139, 55, 164, D25/199
See application file for complete search history.

(56) References Cited

U.S. PATENT DOCUMENTS

| 2,293,744 | A | * | 8/1942 | Miles et al. | 52/547 |
| 4,424,655 | A | * | 1/1984 | Trostle | 52/520 |
| 5,392,579 | A | * | 2/1995 | Champagne | 52/520 |
| 6,625,941 | B2 | * | 9/2003 | Shaw | 52/211 |

* cited by examiner

*Primary Examiner*—Naoko Slack
*Assistant Examiner*—Jessica Laux
(74) *Attorney, Agent, or Firm*—Lathrop & Gage LC

(57) ABSTRACT

A horizontally mounted siding component for finishing of a top course of a vinyl siding installation while minimizing the lateral deformation of the vinyl siding. The invention additionally relates to the method for post-form extruding a thermoplastic dual undersill trim with complex geometry including extensive folding of the extruded material in a series of fixtures.

10 Claims, 10 Drawing Sheets

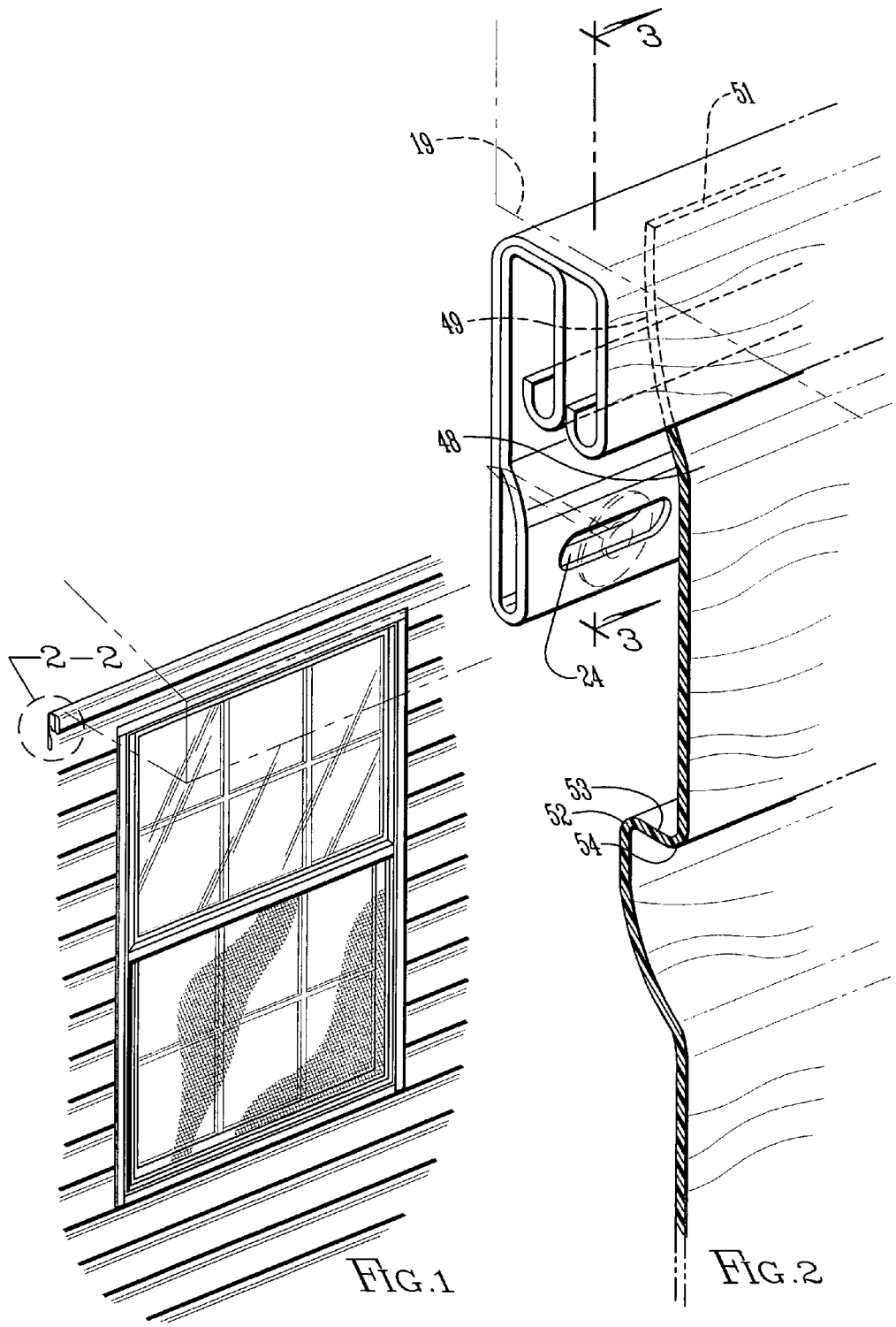

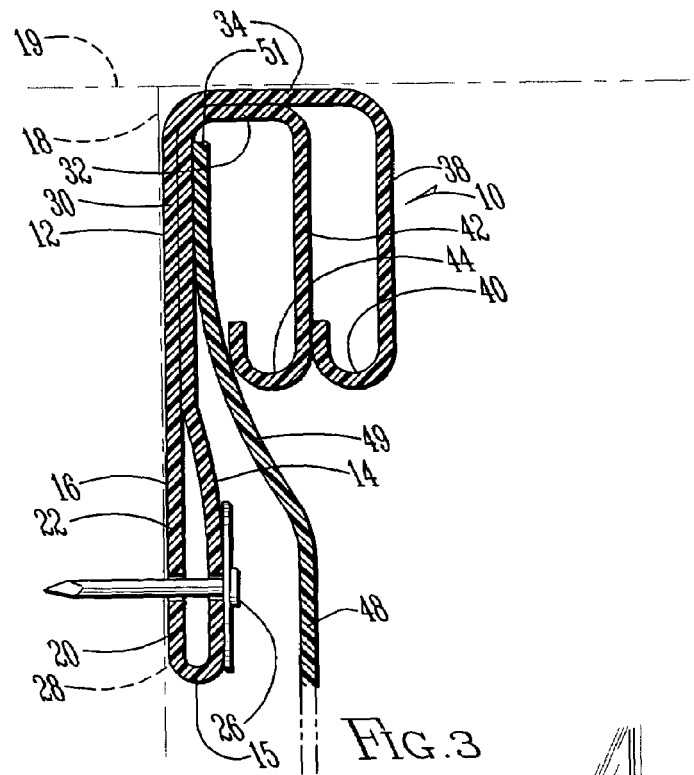
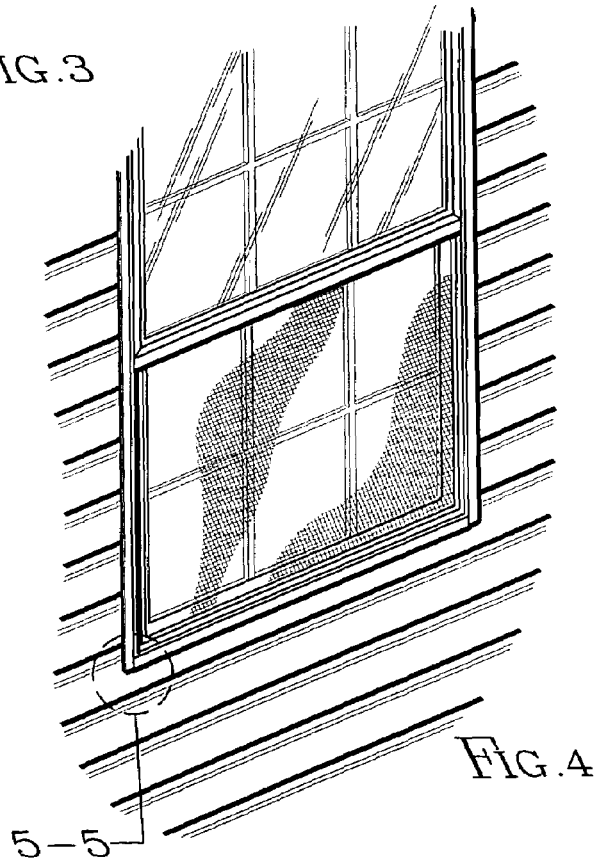

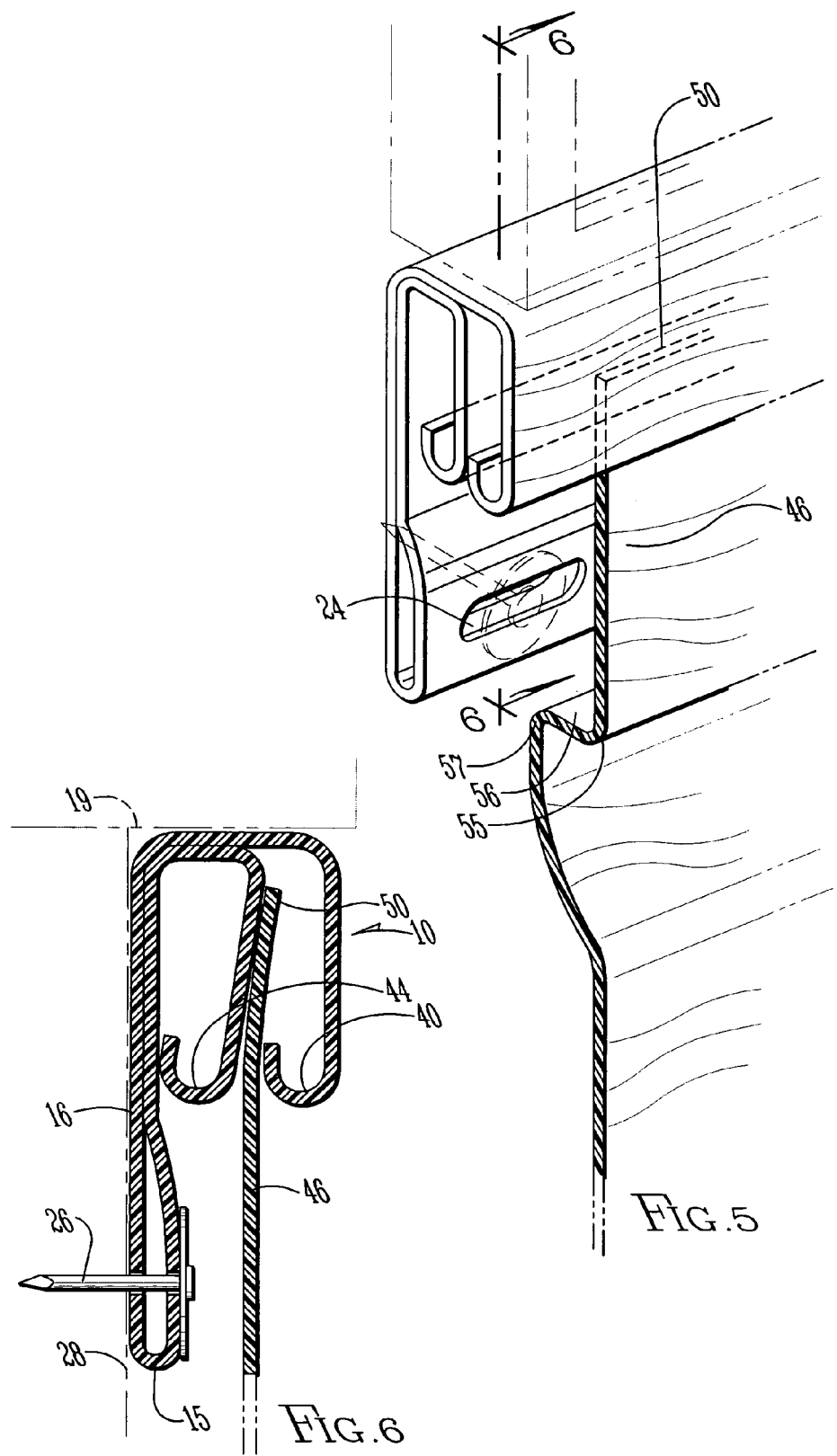

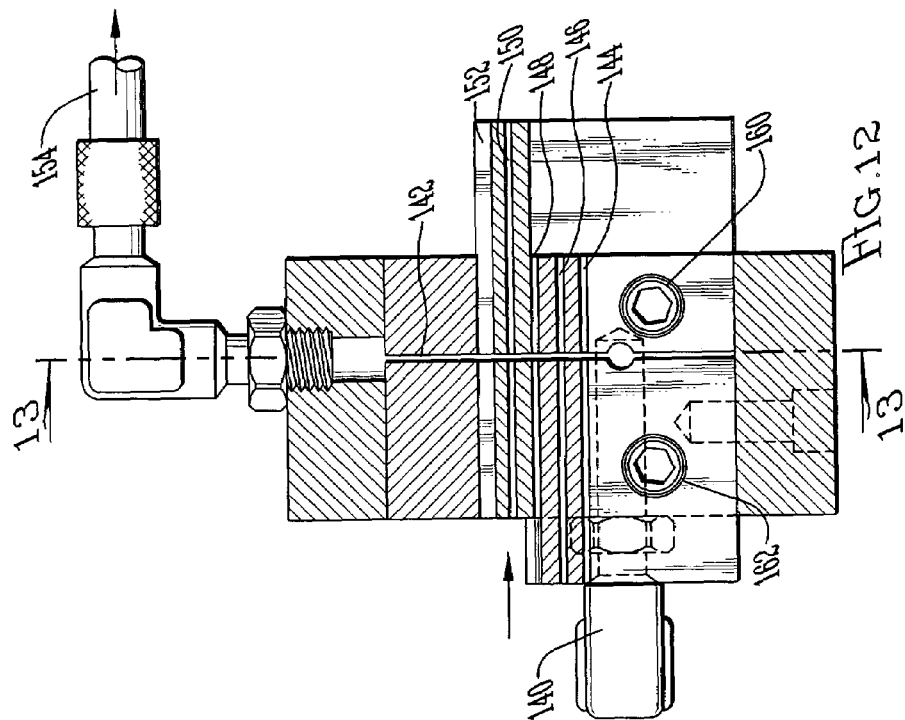
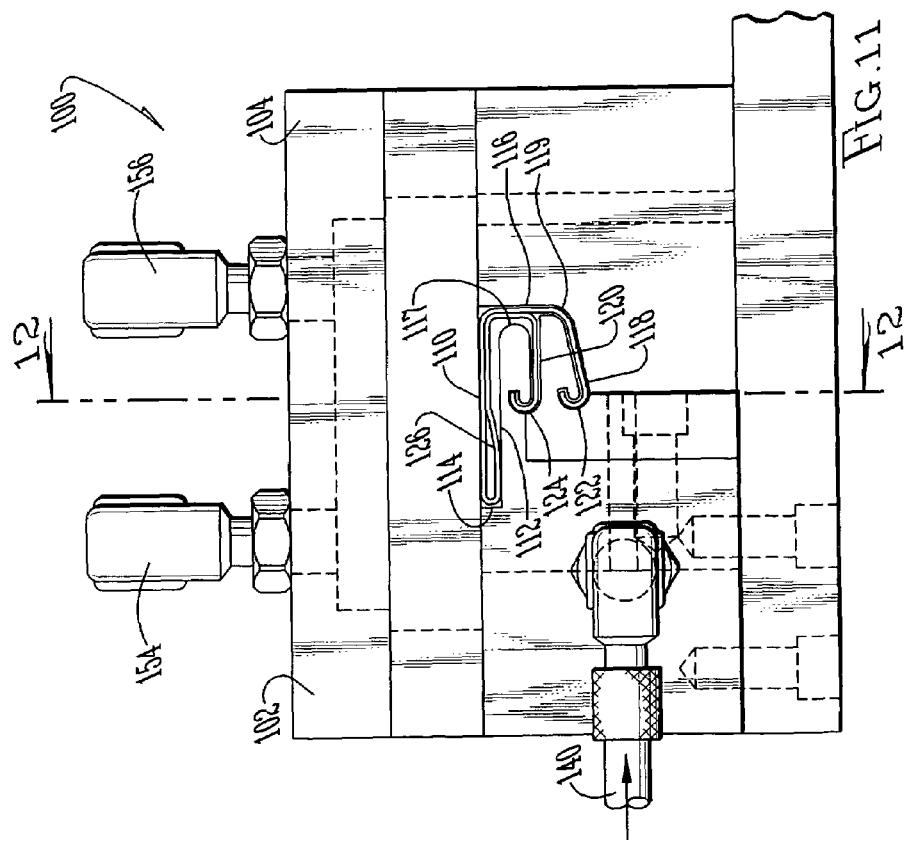

METHOD FOR EXTRUDING AND PRODUCT OF THE METHOD

FIELD OF THE INVENTION

This invention relates to a method for post-form extruding a polyvinyl chloride component with a complex geometry that includes extensive folding of the extruded material by what is typically referred to as a water fixture or a calibrator. The invention also relates to dual undersill trim utilized for finishing a top course of siding installation. The dual undersill trim presents two positions for receiving the top course of siding thereby minimizing the vinyl siding deformation and which is manufactured through utilization of the post-form extrusion method.

BACKGROUND OF THE INVENTION

Vinyl siding currently has a 48 percent share of the U.S. siding market outpacing wood, stucco, stone, concrete, brick and metal. The vinyl siding market is expected to grow by an additional two percent by the year 2005. This explosive growth is the result of vinyl's outstanding durability and its versatility in terms of color, texture and patterns. Currently, many manufacturers of vinyl siding are having difficulty keeping up with market demand. The ability to extrude the polyvinyl chloride into the finished vinyl siding product is principally limited by the feed rate capacity of the production lines. For example, many vinyl siding components are profile extruded which requires extruding polyvinyl chloride through a die at a haul-off rate of between six and ten feet per minute. This compares with feed rates in excess of 150 feet per minute for some post-form extruded products. The dual undersill component had been profile extruded at a haul-off rate of approximately 3 meters per minute (10 feet per minute). A continuous loop version of the dual undersill which will be discussed in more detail below can now be post-form extruded at a haul off rate of approximately 18 meters per minute (60 feet per minute).

The principal drawback to the post-form extrusion process, at least until application of the present methodology, was its inability produce a product, such as the dual undersill, with a complex continuous loop configuration wherein a single sheet of polyvinyl chloride is bent or formed into the desired geometry by pressing it through one or more fixtures at a high rate of speed.

Profile-extrusion of polyvinyl chloride components is a common industrial practice across the globe. Numerous common items are produced from extruded polyvinyl chloride including, guttering, window frames and vinyl siding components. During the production process, the polyvinyl chloride resin is heated in an extrusion device and fed into a profile fixture where the desired shape is forced out of a die under considerable pressure. The process produces precisely dimensioned components, however, one major drawback to the process is the rate of production. It is common to experience a profile-extrusion process rate of no greater than 1.8 to 3 meters per minute (6 to 10 feet per minute). Profile-extrusion of polyvinyl chloride components is a relatively slow process and in the vinyl siding production business, companies must maintain high rates of production to remain profitable.

A second process for producing components manufactured from polyvinyl chloride is post-form extrusion. It is possible, utilizing post-form extrusion, to run production lines at speeds in excess of 45 meters per minute (150 feet per minute), or more than 10 times the speed of profile-extrusion production lines. With post-form extrusion, the extruded and heated polyvinyl chloride is formed into a flat sheet, embossed with a pattern or grain structure for aesthetic appeal, then depending upon the complexity of the desired finished product the sheet is first fed into a preform stage or directly into a fixture, also known as a calibrator, to achieve the desired profile and dimensions. Conventional wisdom has been that components with complex geometries, especially those that are characterized as having a continuous loop construction, wherein a first layer of the component is positioned in the fixture and then a second layer is wrapped back around in a continuous loop immediately atop the first layer could not be produced utilizing post-form extrusion if production rates were in excess of 3 meters per minute (10 feet per minute). Producing continuous loop components such as dual undersill trim having even a few critical bends has proven difficult for many siding manufacturers.

A vinyl siding component, referred to as dual undersill trim, is utilized to facilitate the installation of vinyl siding that is adjacent to a soffit. This is a commonly utilized component produced by many vinyl siding manufacturers, however, it is currently universally produced using the profile-extrusion process because it possesses a geometry considered too challenging to produce using post-form extrusion techniques if speeds much in excess of those utilized in profile-extrusion are sought. Numerous vinyl siding manufacturers have previously attempted to produce dual undersill trim utilizing post-form extrusion, however, the challenges of producing the component utilizing a continuous loop process at speeds approaching 18 meters per minute (60 feet per minute) have proven insurmountable up until now.

The function of dual undersill trim, as opposed to single undersill trim, is to minimize the deformation of the siding in proximity to the soffit or window sill, by providing the siding installer with two positions for placement of the cut edge of the top course of the siding within the dual undersill component. Minimizing deformation is particularly important for maintaining the aesthetic appeal of the siding in proximity to the soffit. Deformation of the siding will manifest itself in an uneven or bulging surface near the soffit. The dual undersill trim allows a siding installer to select between two positions for receiving, as well as obscuring, the cut edge of the siding. The entry point of the first slot of the dual undersill is in close proximity to the vertical wall that the siding is covering and the second slot is spaced away from the wall by approximately 8 mm (0.31 inches) or roughly the span of the center rib typically found on most vinyl siding.

During installation, when the top course of the vinyl siding is cut in proximity to the soffit such that the horizontally cut edge is closer to the plane perpendicular to the back edge of the center rib of the siding than with the front edge of the center rib, then the terminating edge of the vinyl siding is most easily inserted into the dual undersill position closest to the wall being sided. If, however, the cut edge of the siding is closer to the plane perpendicular to the front edge of the center rib than the vertical plane of the back edge of the center rib, then the cut edge should be inserted into the dual undersill position located furthest from the wall being sided with vinyl.

A need in the art therefore exists for a method of producing thermoplastic components of complex geometry at a high rate of speed without causing jamming of the production fixtures or sacrificing the dimensional requirements of the product. A further need exists for an undersill component that offers the vinyl siding installer the option of placing the cut edge of the top course of the vinyl siding in one of two positions within the undersill trim. The two placement options minimize the deformation experienced by the siding as it is installed adjacent the soffit, or beneath the sill of a window frame.

BRIEF SUMMARY OF THE INVENTION

This present invention pertains to a method for post forming extruded material from a single continuous sheet to produce a component such as the dual undersill trim of the present invention. The method comprises continuously feeding a raw material, preferably polyvinyl chloride, into an extrusion device where it is heated and then extruded under pressure. Following extrusion, the polyvinyl chloride is fed into a flat sheet die where a flat sheet, nominally 1 mm in thickness by 200 mm (8 inches) in width, is formed with opposed first and second edges coincident with the longitudinal axis of the sheet. During production set up and following formation of a length of sheet from the flat sheet die, the sheet is positioned on the surfaces of passages in a first section of a pre-form fixture separated into two sections. As the flat sheet passes through the passages of the fixture in production, the desired profile is formed. The sheet material is positioned atop the surfaces of the fixture passages and laid back atop itself in a continuous loop fashion to form the inner and outer layer of the dual undersill trim back panel. The two edges of the flat sheet are also positioned within the passages that will form the inwardly curving arcs extending from the inner and outer flanges of the dual undersill. Once the flat sheet is properly positioned within the fixture the second section of the fixture is secured in position adjacent the first section making ready the fixture to commence production. Once production commences the flat sheet material is pulled through the first fixture beginning the formation of the profile of the dual undersill trim.

Immediately following the pre-form fixture in the production process is a second fixture referred to a the calibrator fixture. As with the first fixture, the flat sheet is positioned atop the surfaces of the passages within a first section of the calibrator fixture. Once the sheet material is positioned atop the surfaces of the passages and laid back atop itself in a continuous fashion to form the inner and outer layer of the dual undersill trim and the two edges of the flat sheet are positioned within the passages that will form the inwardly curving arcs, the second section of the second fixture is secured in position adjacent the first section making ready the fixture to commence production. After the sheet material is positioned within the first and second fixtures and the fixture sections are secured to one another, the fixtures are fully configured for production.

As the polyvinyl chloride is extruded from the extrusion device it passes through the flat sheet die and then into the pre-form fixture where the linear segments comprising the inner and outer layers, the upper and lower flanges and the inner and outer flanges are formed. Additionally, the pre-form fixture commences formation of the non-linear segments which comprise the inwardly curving arcs that are positioned at one extreme of the inner and outer flanges. The calibrator fixture serves to refine the dimensions of the dual undersill trim that were produced in the pre-form fixture bringing those dimensions to within product tolerances. The calibrator fixture, unlike the pre-form fixture, utilizes a reduced air pressure, or vacuum assist, system to pull the polyvinyl chloride that is passing through the calibrator to the outer geometry of the fixture passages. The vacuum assist operates to eliminate jamming of the polyvinyl chloride in the calibrator by reducing the prospect for clogging the center of the fixture passages. After passing through the calibrator where the linear and non-linear segments are appropriately dimensioned and oriented the polyvinyl chloride passes into a water bath where it is cooled and fully hardens before slots are punched in the nail hem and the trim is cut to the desired length.

A product of the process described above is a dual undersill trim component formed from a single sheet of material. The dual undersill comprises, among other features, a back panel created from an inner layer and an outer layer of polyvinyl chloride. The outer layer is placed against the wall that is being sided with the vinyl. The back panel comprises an upper portion and a lower portion and a nail hem with integral nail slots disposed within the lower portion of the back panel. The inner layer of the back panel transitions to the outer layer at the lowermost extreme of the inner and outer layers in a continuous loop fashion. Opposite the lowermost extreme of the back panel, upper and lower flanges extend outwardly in a continuously transitioning fashion from the outer and inner layers respectively. The upper and lower flanges extend outwardly at an angle of approximately 90 degrees from the outer and inner layers. Extending downwardly from the outermost ends of the upper and lower flanges are outer and inner flanges with the flanges terminating in inwardly curving arcs. The inner and outer flanges in conjunction with the inwardly curving arcs receive and obscure the cut edge of the top course of vinyl siding, holding it in place in proximity to the soffit or window sill.

BRIEF DESCRIPTION OF THE DRAWINGS

FIG. 1 is a perspective view of the dual undersill trim embodying features of the present invention as mounted to a wall adjacent a soffit, the soffit shown in phantom;

FIG. 2 is an enlarged view of FIG. 1 of the trim embodying features of the present invention with the cut edge of the vinyl siding shown in phantom positioned between the inner flange and the inner layer of the back panel of the trim;

FIG. 3 is a cross sectional view of the trim embodying features of the present invention showing the cut edge of a sloping vinyl siding section inserted between the inner flange and the inner layer of the back panel of the trim taken along line 3—3 of FIG. 2;

FIG. 4 is a perspective view of the trim embodying features of the present invention in an alternative position beneath a window sill;

FIG. 5 is an enlarged view of the selected features of FIG. 4 of the trim embodying features of the present invention with the cut edge of the vinyl siding, shown in phantom, positioned between the inner and outer flanges;

FIG. 6 is a cross sectional view of the trim embodying features of the present invention showing the cut edge of sloping vinyl siding inserted between the inner and outer flange of the dual undersill taken along line 6—6 of FIG. 5;

FIG. 11 is a front view of the calibrator fixture showing the profile of the dual undersill trim and the vacuum ports;

FIG. 12 is a cross sectional view of the calibrator fixture embodying features of the present invention depicting the vacuum channels located within the calibrator taken along line 12—12 of FIG. 11;

DETAILED DESCRIPTION OF THE INVENTION

Dual Undersill Trim Apparatus

Figure 7:
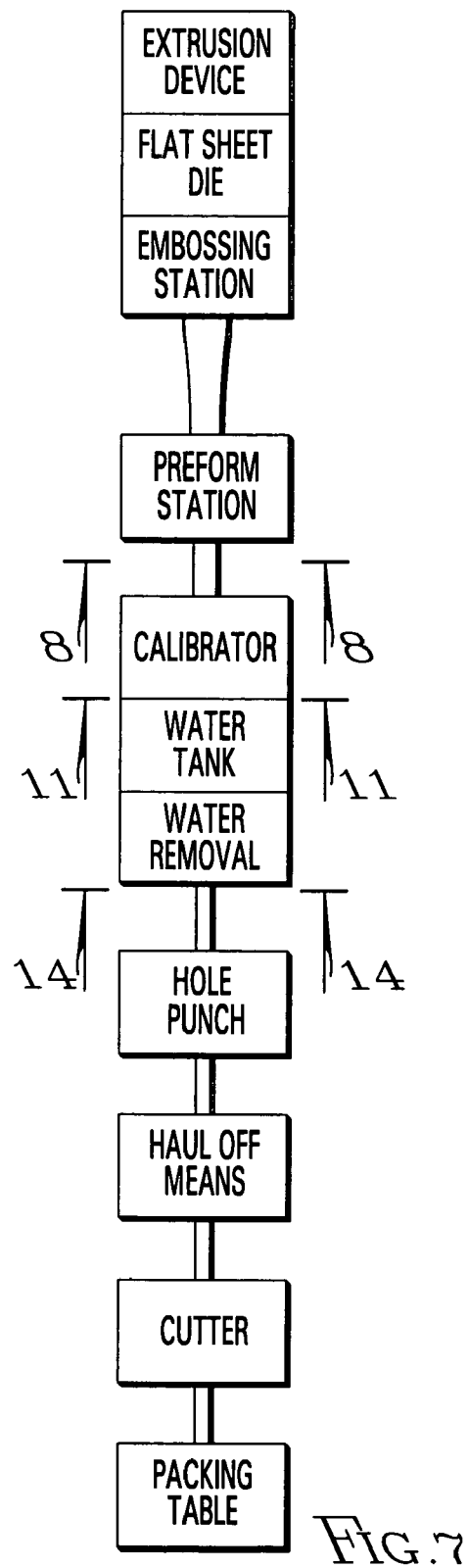
FIG. 7 is a process flow diagram detailing the steps of production of the dual undersill trim.

As shown in FIGS. 1 and 4, the dual undersill trim 10 is typically positioned against the wall of a building adjacent the building soffit or beneath a window sill. The dual undersill trim provides a much needed approach to finishing off a top course of vinyl siding and simultaneously avoiding deformation of the top course when the upper edge is inserted into the trim. Depending upon whether the top course of siding is cut on a vertical section or a sloping section dictates which of the two positions of the dual undersill trim will be utilized.

As depicted in FIGS. 2, 3 and 6 the dual undersill trim 10 is constructed from a single sheet of polyvinyl chloride thermoplastic nominally 1 mm thick and comprises, among other features to be discussed below, a back panel 12 with an inner layer 14 and an outer layer 16. The outer layer 16 of the back panel 12 is mounted against a building wall 18 and beneath the building soffit 19 during installation of the dual undersill trim 10. In the preferred embodiment set forth below specific dimensions are provided, however, these dimensions are not intended in any way to constrain alternative embodiments.

A preferred embodiment includes a gap of approximately 2.0 mm exists between the inner layer 14 and the outer layer 16 at the lower portion 20 of the back panel 12 to form a nail hem 22. During production, slots 24 are punched into the nail hem 22 and during installation nails 26 are driven through the slots 24 and secured into the wall 28 being sided to hold the dual undersill trim 10 in position against the wall 18. The nail hem 22 at the lower portion 20 of the back panel 12 extends for approximately 15 mm (0.6 inches) in length at which point the inner layer 14 and outer layer 16 of the back panel converge and are separated by less than a 0.1 mm (0.004 in) gap.

After converging, the inner and outer layers traverse together for approximately an additional 25 mm (1 inch) forming the upper portion 30 of the back panel. After traversing the approximately 25 mm (1 inch), the upper portion 30 of the back panel, including both the inner and outer layers commence an outward transition to a lower flange 32 and upper flange 34 respectively. The upper and lower flanges 32, 34 are both formed from the same continuous sheet of thermoplastic material as will be discussed in more detail below. Both flanges 32, 34 extend outwardly at approximately 90 degrees from the outer layer 16 and the inner layer 14 respectively. The outer layer 16 of the upper portion 30 of the back panel 12 folds atop the inner layer 14. The upper flange 34 extends outwardly approximately 15 mm (0.6 inches) from the outer layer 16 while the lower flange 32 extends approximately 10 mm (0.4 inches) beyond the inner layer 14. The upper flange 34 extends approximately 5 mm (0.2 inches) beyond the lower flange 32 before beginning a downward traverse at the point where it is most outwardly extended. The upper flange 34 at its outermost extent begins a downward traverse forming an outer flange 38 that extends downwardly approximately 25 mm (1 inch) before forming an inwardly curving arc 40 with a radius of curvature of approximately 2 mm (0.08 inches). The lower flange 32, at its most outwardly extending point begins a downward traverse forming an inner flange 42 that extends approximately 24 mm (0.95 inches) before forming an inwardly curving arc 44 with a radius of curvature of approximately 2 mm (0.08 mm).

The dual undersill trim is typically cut into either 8 or 12 foot lengths at the factory. These entire lengths of trim 10, or a section cut to the desired length, is then installed immediately beneath the soffit, or window sill, as depicted in FIGS. 3 and 6. For installation of the trim beneath a soffit the vinyl siding installer begins by securing a course of vinyl siding to the base of the wall nearest the ground. As the siding courses are installed one-a-top the other, they eventually approach the soffit or the window sill. Generally the final course, or top course, of siding to be installed must be cut or trimmed to a length that will allow it to fit under the soffit and be received into the undersill trim.

When the top course of the vinyl siding is cut in proximity to the soffit such that the horizontally cut edge 51 is closer to the plane perpendicular to the back edge 52 of the center rib 53 of the siding than with the front edge 54 of the center rib 53, then the terminating edge 51 of the vinyl siding is most easily inserted between the inner layer 14 and the inner flange 42 as shown in FIG. 3. If, however, as shown in FIGS. 5 and 6, the cut edge 50 of the siding is closer to the plane perpendicular to the front 55 of the center rib 56 than the plane perpendicular to the back 57 of the center rib 56, then the cut edge 50 should be inserted between the outer flange 38 and the inner flange 42 as shown in FIG. 6.

When the cut edge 51 is inserted between the inner layer 14 and the inner flange 42, the inner flange flexes slightly outwardly, applying pressure to the siding 48. The pressure applied to the siding assists in securing the siding within the trim 10 in proximity to the soffit 19 so that the cut edge 51 does not work loose during high winds but can be removed when necessary for repairs that may be required. When the cut edge 50 is inserted between the inner flange 42 and the outer flange 38, both flanges 38, 42 flex slightly and apply pressure to the siding 46. As with the inner position of the dual undersill, the outer position serves to secure the siding 46 in position.

Dual Undersill Trim Method of Production

As shown in FIG. 7 the process for producing a dual undersill component through post-form extrusion includes feeding polyvinyl chloride resin, along with the desired coloring agents into the hopper of an extrusion device. An example of a preferred extrusion device is manufactured in Germany by Kraussmafei. The extrusion device is comprised of a large screw that augers the product forward inside of a barrel. The friction created by the rotation of the auger screw against the barrel produces heat. The heat produced by the friction along with the assistance of heater bands strapped around the barrel of the extrusion device melts the polyvinyl chloride resin. The heater bands also serve to maintain a constant temperature for the resin as it exits the barrel of the extrusion device. An example of a preferred heater band is also manufactured in Germany by Kraussmafei.

Melted polyvinyl chloride is then forced or extruded from the barrel and fed into a flat sheet die at a temperature of approximately 176° C. (350° F.). The flat sheet die compresses the extruded polyvinyl chloride into a thin sheet preferably about 200 mm (8 inches) wide and about 1 mm (0.04 inches) thick in preparation for further processing. The thin sheet has opposed first and second edges that are aligned with a longitudinal axis of the sheet. Examples of preferred flat sheet dies are manufactured by EDI or Production Components, Inc.

As will be discussed in more detail below, the flat sheet is ultimately formed into the desired dual undersill trim profile. The profiled dual undersill trim is captured by a haul-off machine at or very near the end of the production process that traditionally consists of two powered counter-rotating wheels that pinch the trim and pull it through the production process at the desired rate. It is the haul-off machine, coupled with the continuous extrusion of the material from the extrusion device that allows the thermoplastic material to be continuously formed into the desired profile.

Following the flat sheet die is an embossing station for adding texture to the surface of the flat sheet and preferably following that are one or more cooling rolls that serve to transfer heat from the vinyl siding through both conduction and convection. After passing through the cooling rolls the temperature of the vinyl siding is lowered to approximately 115° C. (240° F.) causing the polyvinyl chloride to stiffen. The stiffening of the polyvinyl chloride facilitates maintaining the material's shape during further processing and reduces its tackiness and hence propensity to adhere to itself when the thermoplastic is laid atop itself.

Figure 8:
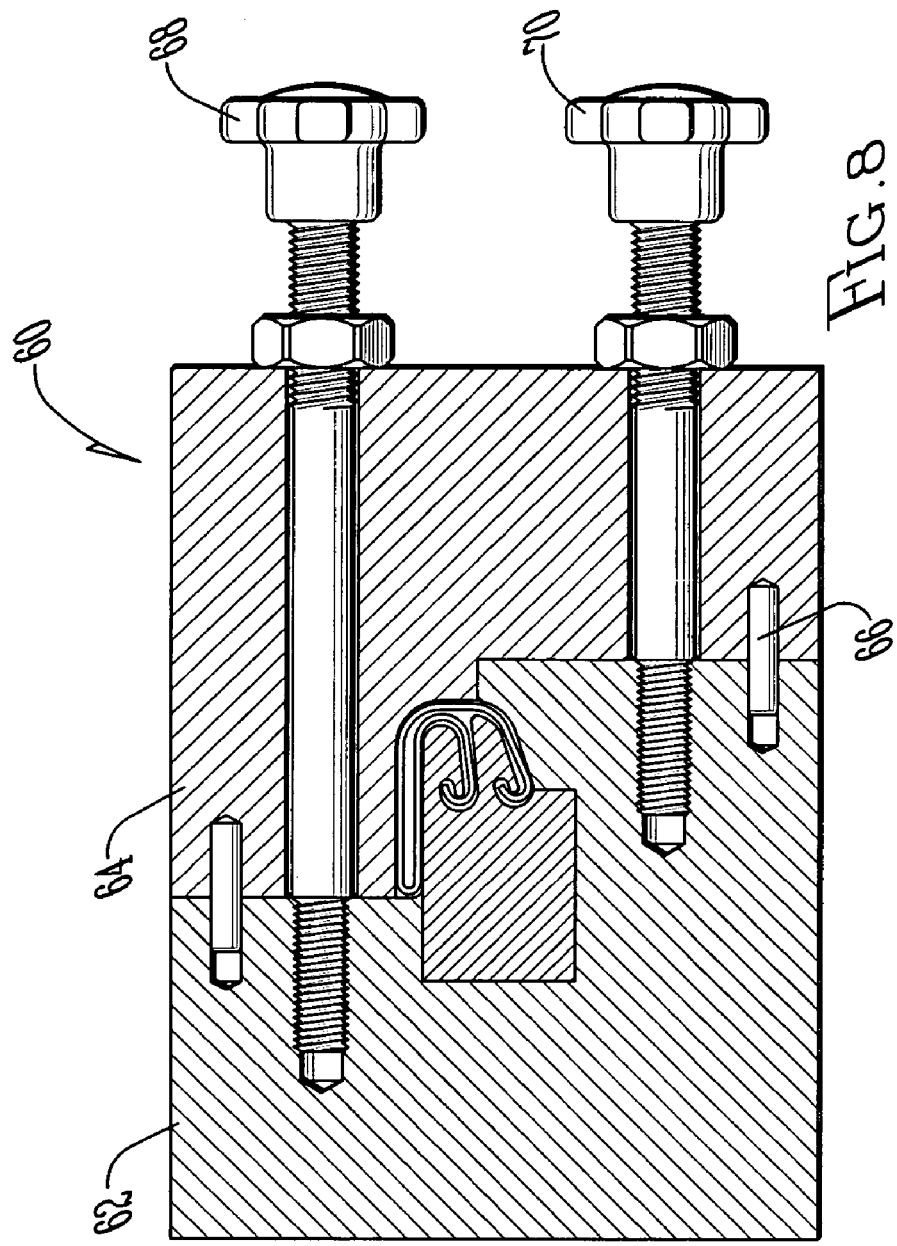
FIG. 8 is a sectional view of the pre-form fixture embodying features of the present invention, utilized for forming the trim embodying features of the present invention, showing the pre-form passages and means for securing together the pre-form fixture.

From the cooling rolls the flat sheet polyvinyl chloride moves to a preform fixture. The flat sheet passes from the cooling rolls into the preform fixture and begins the transition of the flat sheet into the desired dual undersill profile. The preferred construction of the pre-form fixture consists generally of a two section fixture produced from MICARTA®, an engineered thermoplastic. As depicted in FIG. 8, the preferred configuration of the pre-form fixture utilizes 60 a first section 62 and a second section 64 with dowel pins 66, or some other suitable means, to ensure proper alignment of the two sections. The two sections 62, 64 are rigidly joined together preferably utilizing bolts 68, 70 or some other suitable means, such as clamps, prior to the flat sheet material passing through the pre-form fixture 60. The preform fixture 60 is molded with tolerances of ±0.5 mm (0.02 inch). In addition, the surfaces 72, 74, 76, 78 of the pre-form fixture that come into contact with the polyvinyl chloride material are preferably polished to reduce the friction forces between those surfaces and the polyvinyl chloride sheet transitioning through the fixture. The smooth pre-form fixture surfaces 72, 74, 76, 78 serve to reduce the prospect for jamming of the polyvinyl chloride in the passages of the pre-form fixture.

Figure 9:
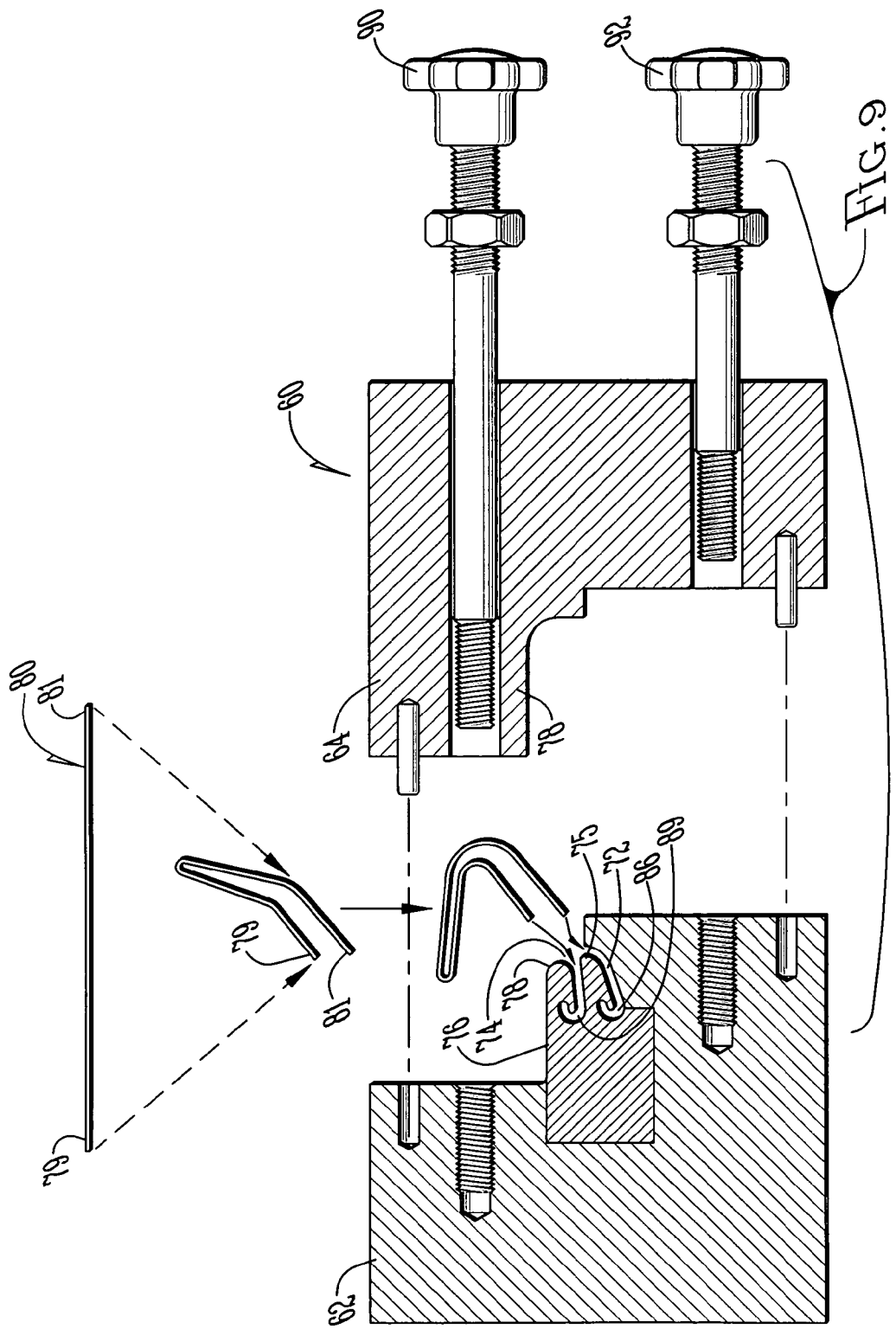
FIG. 9 is a sectional view of the pre-form fixture embodying features of the present invention separated and showing three stages for manipulating the sheet into the passages of the pre-form fixture.
Figure 10:
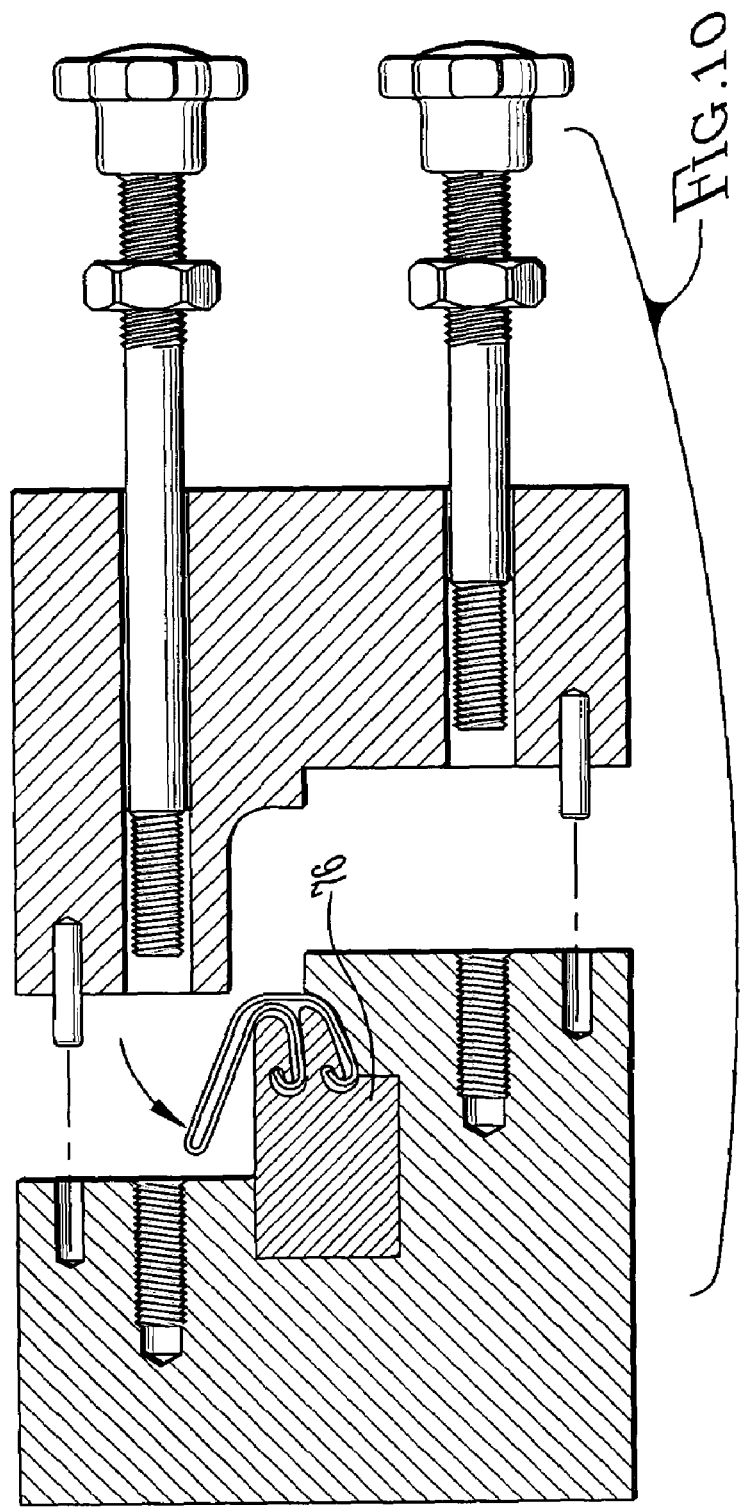
FIG. 10 is a sectional view of the pre-form fixture embodying features of the present invention separated and showing the positioning of the thermoplastic sheet into the fixture prior to securing the pre-form fixture sections together.

As shown in FIGS. 9 and 10, during production set-up the first section 62 and the second section 64 of the preform fixture are separated from one another. Once the sections of the preform fixture are separated, the first edge 79 of the flat sheet 80 of polyvinyl chloride material is inserted into and laid against the surfaces 74, 84 of the first section 62 that form the inwardly curving arc 44 and the inner flange 42. Next, the second edge 81 of the flat sheet 80 is inserted into and laid against the surfaces 72, 82 that form the inwardly curving arc 40 and the outer flange 38. Following the insertion of both ends of the flat sheet 80 material into the preform fixture first section 62, the flat sheet 80 material extending from the first edge 79 is wrapped around the surface 73 forming the lower flange 32. Simultaneously, the flat sheet material extending from the second edge 81 is wrapped around the surface 75 forming the upper flange 34.

As shown in FIG. 10, the remainder of the flat sheet 80 extending from both edges 79, 81 is wrapped, one layer atop the other, onto the surface 76 forming the back panel 12. The inner layer 14 and the outer layer 16 travel atop one another until reaching the lowermost extreme 15 of the back panel 12. At the lowermost extreme 15 of the back panel the inner layer 14 diverges from the outer layer 16 principally because of the resistance of the thermoplastic material to immediately fold upon itself. Attempting to force the inner layer 14 and outer layer 16 to immediately fold over at the lowermost extreme 15 would weaken the material at the lowermost extreme 15 and introduce undesirable stresses into the material.

Once the flat sheet 80 material is positioned as described above, the second section 64 of the preform fixture 60 is moved into position immediately adjacent the first section 62 as shown in FIG. 10. The second section 64 possesses a surface 78 that participates in the formation of the back panel 12 of the dual undersill. The surface 78 controls the formation of the outer layer 16 of the back panel 12.

Since the flat sheet 80 is laid back on top of itself, it is preferable that the temperature of the material be lowered to the point where the surfaces laid atop one another are no longer tacky and adhere to one another. Once the flat sheet 80 is laid onto the surfaces 72, 73, 74, 75, 76 of the first section 62, the second section 64 of the pre-form fixture is secured against the first section using threaded attachment devices 90, 92 or other appropriate securing means. Upon securing the first section 62 and the second section 64 together, the preform fixture 60 is ready to commence production. An example of a preferred pre-form fixture is manufactured by Teams Design, Inc. of 6750 West 75$^{th}$ Street, Overland Park, Kans.

After passing through the pre-form fixture the flat sheet has nominally attained the profile of the dual undersill trim 10. The pre-form station 60 has served to bend the flat sheet 80 about the multiple axes that are all parallel to the longitudinal axis of the flat sheet. The bends about the multiple axes form the various linear and non-linear segments that comprise the dual undersill trim 10. The linear segments include the inner layer 14 and the outer layer 16, the upper flange 34 and the lower flange 32 as well as the outer flange 38 and the inner flange 42. The formation of each of these linear segments will be discussed in more detail below. The nonlinear segments include the inwardly curving arc 44 extending from the inner flange 42 and the inwardly curving arc 40 extending from the outer flange 38. The nonlinear segments will also be discussed in more detail below.

Though not dimensionally accurate after passing through the preform fixture 60, the vast majority of the complex bending and folding has been accomplished in the preform fixture and the profile of the dual undersill is similar in appearance to the finished product. Immediately following the pre-form fixture 60 in the production sequence is a second fixture typically referred to as a calibrator 100.

The calibrator 100, as shown in FIG. 11, provides final dimensional refinement to the profile of the dual undersill 10 exiting the preform fixture 60. The calibrator adjusts preformed bends, reduces angles and sizes every feature of the dual undersill trim discussed in detail above in order to attain product specifications. Unlike the preform fixture 60 which is preferably produced from MICARTA®, the calibrator 100 is preferably machined from STAVAX® or standard grade stainless steel. The calibrator 100 is preferably machined with dimensional tolerances of ±0.5 mm (0.02 inches) and the surfaces contacting the polyvinyl chloride material are preferably polished to a mirror finish. The polishing of the contact surfaces reduces the drag caused by the friction forces between the calibrator and the polyvinyl chloride material. As with the preform fixture 60, the calibrator 100 can be separated into a first section 102 and a second section 104. When separated, the internal surfaces 110–124 utilized for forming the profile of the dual undersill are exposed in a first section 102 and a second section 104.

As previously discussed, the thermoplastic material is first extruded from the extrusion device and then into the flat sheet die. At production start-up an extended length of flat sheet material is extracted from the die. This provides the production personnel with sufficient material to load into the preform station, the calibrator, and ultimately the haul-off machine that pulls the material through the entire production process.

As shown in FIG. 11, during production set-up the calibrator first section 102 and the second section 104 are separated from one another. Once the sections of the calibrator are separated, the first edge 79 of the flat sheet 80 is inserted into and laid against the surfaces 120, 124 of the first section 102 that form the inwardly curving arc 44 and the inner flange 42. Next, the second edge 81 of the flat sheet 80 is inserted into and laid against the surfaces 118, 122 that form the inwardly curving arc 40 and the outer flange 38. Following the insertion of both ends of the flat sheet 80 into the calibrator first section 102, the flat sheet 80 extending from the first edge 79 is wrapped around the surface 117 forming the lower flange 32. Simultaneously, the flat sheet material extending from the second edge 81 is wrapped around the surface 119 forming the upper flange 34.

As shown in FIG. 11, the remainder of the flat sheet 80 extending from both edges 79, 81 is wrapped, one layer atop the other, onto the surface 112 forming the back panel 12. The two layers forming the inner layer 14 and the outer layer 16 are positioned atop one another until reaching the region of the nail hem 22 or the lowermost extreme 15 of the back panel. At that point the inner layer 14 diverges from the outer layer 16 principally because of the resistance of the thermoplastic material to immediately fold upon itself. Attempting to force the inner layer 14 and outer layer 16 to fold over after the direction change would weaken the material at the point of transition and introduce undesirable stresses into the material. After the thermoplastic material is placed into the designated spaces the two calibrator sections 102, 104 are secured together, with bolts 160, 162 or other appropriate securing means.

Figure 15:
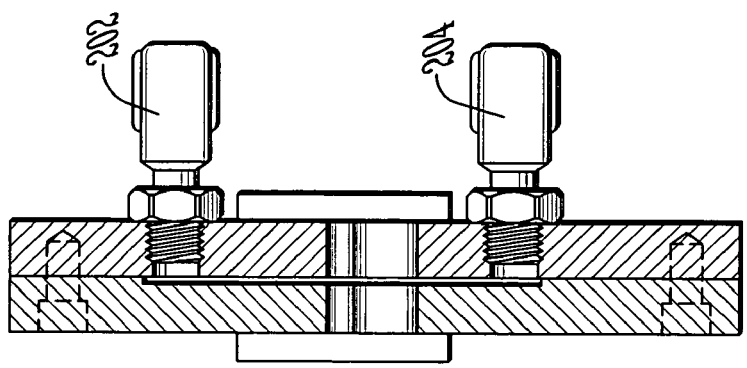
FIG. 15 is a cross sectional view of the water cooling apparatus taken along line 15—15 of FIG. 14.
Figure 14:
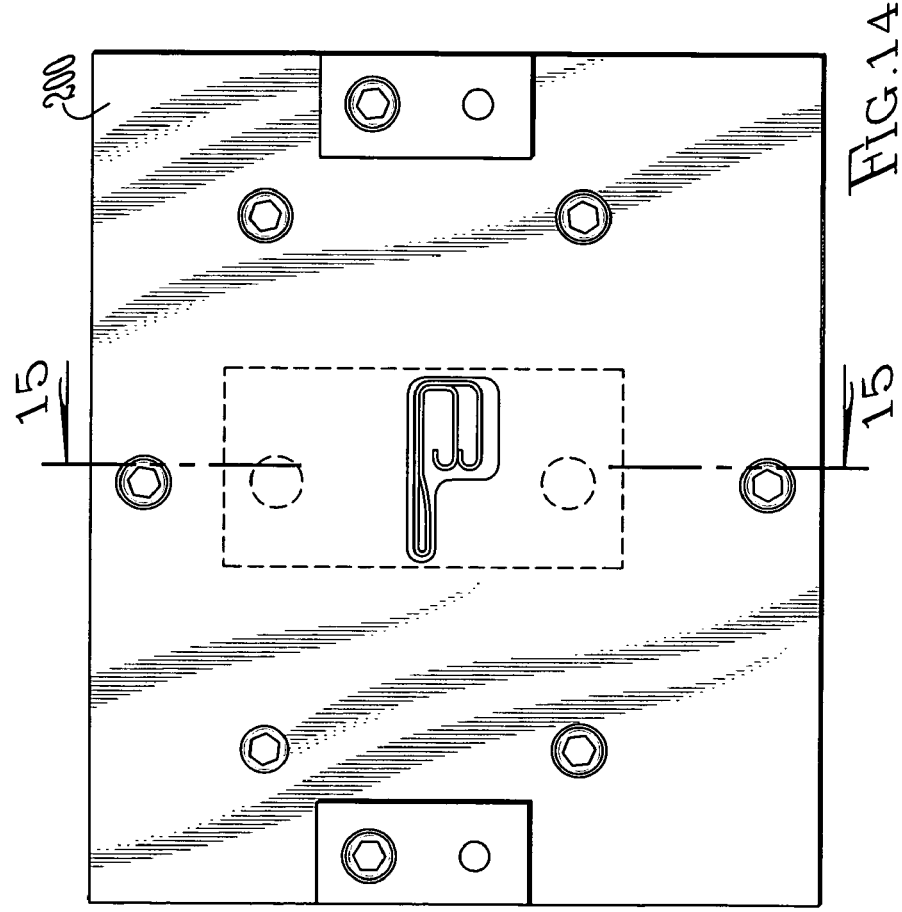
FIG. 14 is a front view of the water cooling apparatus.

Once the thermoplastic material with the profile of the dual undersill trim exits the calibrator it passes through a water bath lowering the temperature of the material to approximately 38° C. (100° F.). The water removal apparatus 200 is shown in FIG. 14 and 15, detailing water inlet port 202 and water removal port 204. Lowering of the temperature of the post formed thermoplastic material increases the rigidity of the trim component and once the component passes out of the calibrator no further changes in its dimensions can be tolerated. A preferred set up of the post-form production line utilizes a water bath immediately upon the undersill trim exiting the calibrator 100. Heat is transferred more readily by using a water bath than attempting to transfer the heat through convection to the air.

Figure 13:
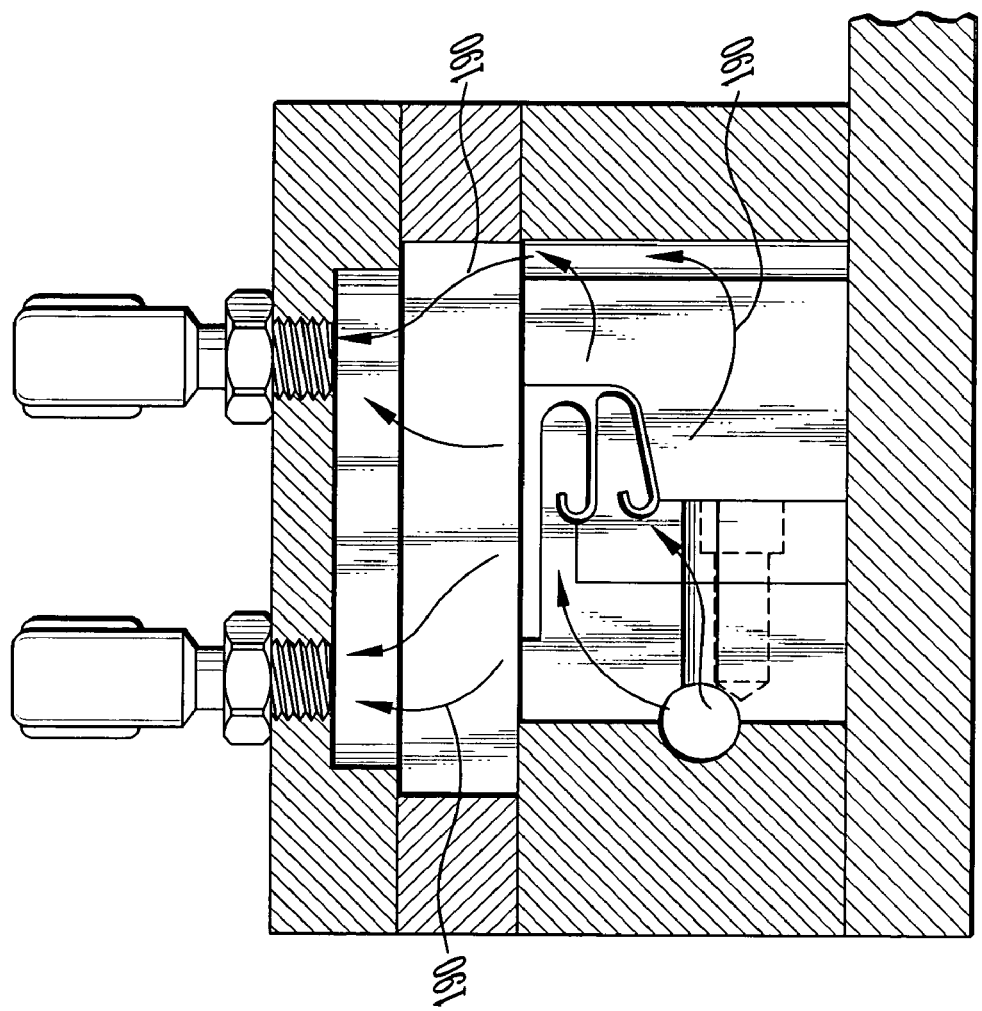
FIG. 13 is a cross sectional view of the calibrator fixture embodying features of the present invention depicting the direction of air flow created by the vacuum source and taken along line 13—13 of FIG. 12.

As shown in FIGS. 11–13, the calibrator 100 utilizes an air pressure reduction system to pull the thermoplastic material against the internal calibrator surfaces 110–124 as the material passes through the calibrator. FIG. 11 depicts the inlet 140 through which air is drawn, and water when additional cooling is necessary, into the calibrator 100. Air is piped into the calibrator 100 and channeled through the passages formed by the surfaces 110–124. Cross sectional drawing, FIG. 12 reveals the channel 142 passing through the calibrator that routes the air into and then out of the profile passages 144, 146, 148, 150, 152 and out through the twin exit ports 154, 156. FIG. 13 reveals the lines of influence 190 that are produced by the reduced air pressure occurring adjacent the internal surfaces of the calibrator. The calibrator operates on the principle that an increase in velocity of a fluid passing over a surface causes a reduction in air pressure. As the thermoplastic material passes through the calibrator the reduced air pressure at the surface of the calibrator improves the flowability of the thermoplastic and reduces the incidence of jamming of the material in the calibrator. An air pressure differential of no less than 17 kpascals (5 inches of Hg) and no more than 34 kpascals (10 inches of Hg) is preferable at the calibrator inlet 140 to maximize flow of the thermoplastic material and yet avoid unnecessarily abrading the surface of the calibrator with excessive force being applied by the thermoplastic material passing through the calibrator. Utilization of the design described above with a reduced internal air pressure configuration allows for production speeds in excess of 18 meters per minute (60 feet per minute).

The foregoing specification describes only the embodiment of the invention shown and/or described. Other embodiments may be articulated as well. The terms and expressions used, therefore, serve only to describe the invention by example and not to limit the invention. It is expected that others will perceive differences which, while different from the foregoing, do not depart from the scope of the invention herein described and claimed. In particular, any of the specific constructional elements described may be replaced by any other known element having equivalent function.

What is claimed is:

1. A dual undersill trim component formed from a flat sheet of material for minimizing the deformation of a top course of vinyl siding installed in proximity to a soffit or window sill comprising:
   a back panel comprised of an inner layer and an outer layer with an upper portion and a lower portion, a nail hem with integral nail slots disposed within the lower portion of the back panel, the inner layer transitioning to the outer layer at the lowermost extreme of the inner and outer layers, upper and lower flanges disposed opposite the lowermost extreme of the inner and outer layers, the upper and lower flanges extending outwardly from the outer and inner layers respectively, inner and outer flanges extending downwardly from the lower and upper flanges respectively, the inner and outer flanges terminating in first and second inwardly curving arcs respectively.

2. The dual undersill of claim 1, wherein the back panel, upper and lower flanges, inner and outer flanges and inwardly curving first and second arcs are comprised of polyvinyl chloride.

3. The dual undersill of claim 1, wherein the back panel, upper and lower flanges, inner and outer flanges and first and second inwardly curving arcs are comprised of a single continuous sheet.

4. The dual undersill of claim 3, wherein the sheet is initially approximately 200 mm wide and approximately 1 mm thick.

5. The dual undersill of claim 1, wherein the inner layer and outer layer, upper and lower flanges, inner and outer flanges and first and second inwardly curving arcs are each approximately 1 mm in thickness.

6. A dual undersill trim component comprising:
   (a) a back panel formed from a single sheet of material, the back panel further comprising an inner and outer layer, the inner layer transitioning to the outer layer at a lowermost extreme of the back panel;

(b) an upper and lower flange formed from the single sheet of material, the upper and lower flanges extending outwardly from the outer and inner layer respectively opposite the lowermost extreme of the back panel;
(c) an inner and outer flange formed from the single sheet of thermoplastic, the inner flange extending downwardly from the lower flange opposite the inner layer, the outer flange extending downwardly from the upper flange opposite the outer layer;
(d) a first and second inwardly curving arc formed from a single sheet of thermoplastic, the inner flange terminating in the first inwardly curving arc, the outer flange terminating in the second inwardly curving arc.

7. The dual undersill of claim 6, wherein the single sheet is comprised of a thremoplastic.

8. The dual undersill of claim 6, wherein the single sheet is approximately 200 mm wide and 1 mm thick.

9. The dual undersill of claim 6, wherein the inner and outer layer, the upper and lower flange, the inner and outer flange and the first and second inwardly curving arcs are about 1 mm in thickness.

10. The dual undersill of claim 6, wherein the first and second inwardly curving arcs have a radii of curvature of about 2 mm.

\* \* \* \* \*